Dec. 24, 1940.  G. F. MAGLOTT  2,225,916

FLUID PRESSURE REGULATING DEVICE

Filed May 28, 1938  2 Sheets-Sheet 1

Witness
Charles T. Olson

Inventor
George F. Maglott

Dec. 24, 1940.   G. F. MAGLOTT   2,225,916
FLUID PRESSURE REGULATING DEVICE
Filed May 28, 1938   2 Sheets-Sheet 2

Witness
Charles T. Olson

Inventor
George F. Maglott
by Fish Hildreth
Cary & Jenney attys

Patented Dec. 24, 1940

2,225,916

UNITED STATES PATENT OFFICE 2,225,916

FLUID PRESSURE REGULATING DEVICE

George F. Maglott, Wrentham, Mass., assignor to Brown and Sharpe Manufacturing Company, a corporation of Rhode Island Application May 28, 1938, Serial No. 210,559

19 Claims. (Cl. 50—11)

The present invention relates to improvements in fluid pressure regulating devices, and more particularly to fluid pressure regulating devices of the general type having a fluid pressure control element arranged to be acted upon by the pressure to be regulated against a uniform regulating fluid cushion pressure.

It is a principal object of the present invention to provide in a pressure regulating device of this general description for regulating the actuating pressures in a fluid pressure system, a novel auxiliary fluid pressure regulating means for maintaining a uniform fluid cushion pressure in the device, whereby a more accurate and dependable operation of the device is obtained.

It is more specifically an object of the invention to provide in a device of the type described for regulating the actuating pressures in an oil or other liquid pressure system, an auxiliary pressure regulating valve which is highly sensitive and accurate in operation to maintain the required uniform fluid cushion pressure in the device substantially without fluctuation and for all conditions of operation of the device.

It is another object of the invention to provide in a pressure-regulating valve for regulating the actuating pressures in a fluid-pressure system, improvements in construction and mode of operation of the valve which are well adapted to remove the objectionable chatter and excessive wear of the valve seat ordinarily encountered in such valves, particularly when employed for the regulation of relatively heavy actuating pressures.

Figure 1:
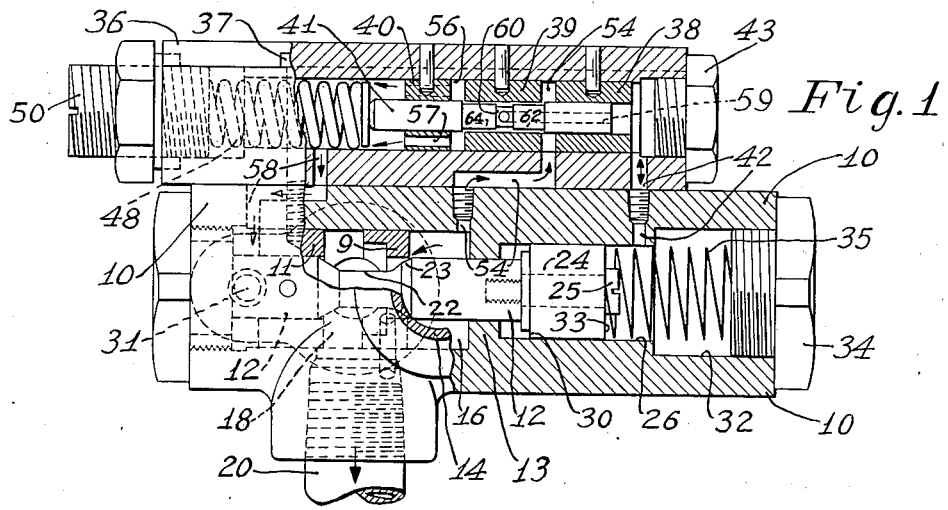
Figure 2:
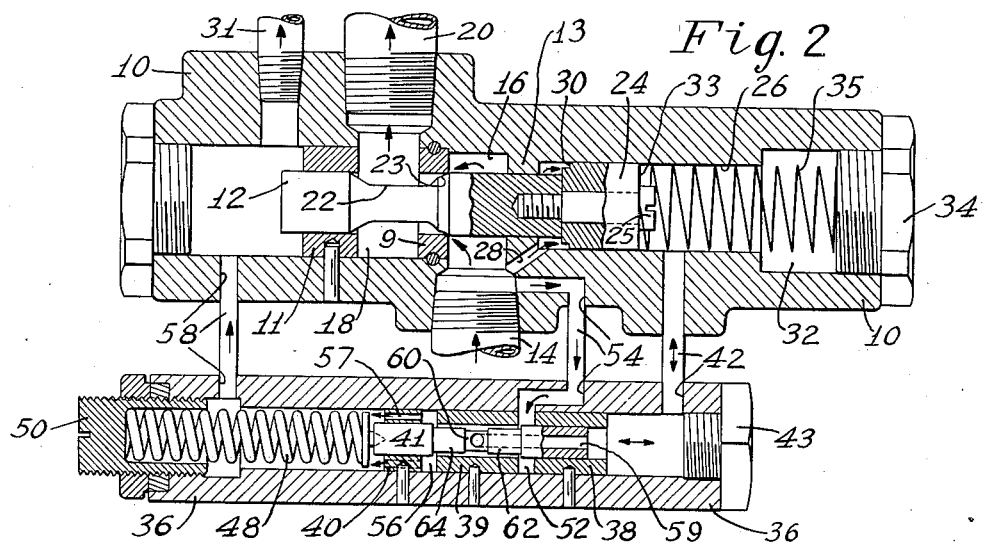
Figure 3:
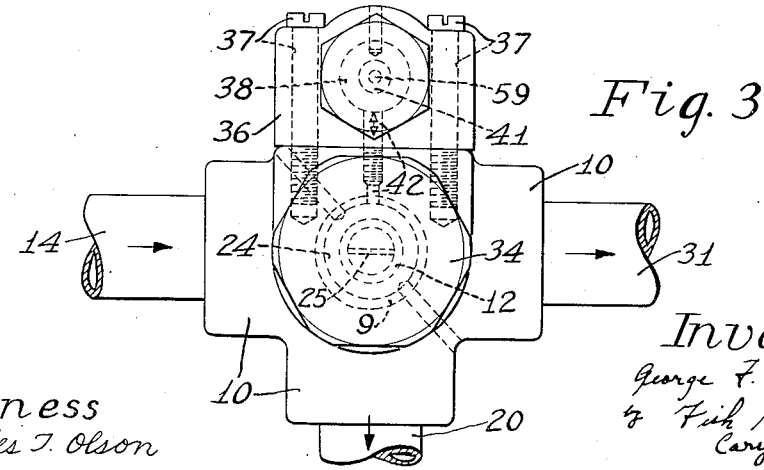
Figure 4:
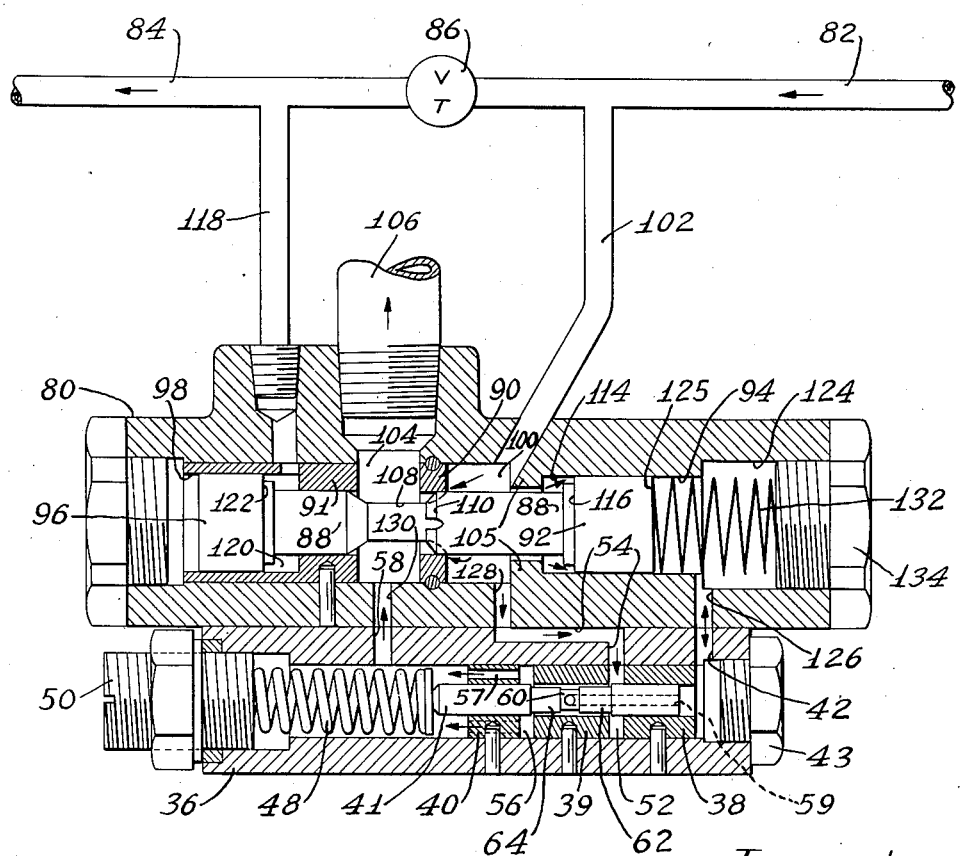

With these and other objects in view, as will hereinafter appear, the several features of the invention consist in the devices, combinations and arrangement of parts hereinafter described and claimed which, together with the advantages to be obtained thereby, will be readily understood by one skilled in the art from the following description taken in connection with the accompanying drawings, in which Fig. 1 is a sectional view of a pressure-regulating valve embodying therein the applicant's auxiliary valve mechanism for maintaining a constant fluid cushion pressure in the regulating valve; Fig. 2 is a somewhat diagrammatic showing of the regulating valve and auxiliary pressure regulating valve mechanism shown in Fig. 1 to illustrate in somewhat diagrammatic form and on a larger scale the construction and mode of operation of the valve mechanisms; Fig. 3 is an end view of the valve mechanism shown in Fig. 1 looking from the right; and Fig. 4 is a somewhat diagrammatic view showing the application of applicant's auxiliary pressure regulating valve means as applied to a differential pressure regulating device.

The present invention is herein disclosed as embodied in a fluid pressure regulating device of the general type having a fluid pressure regulating valve including a piston which is arranged to be acted upon by the pressure to be regulated against a uniform regulating fluid cushion pressure for controlling the movement of the valve to maintain a desired adjustment of the fluid pressure in a fluid pressure system. Such pressure regulating valve mechanisms are well-known in the art, in which the cushion pressure is ordinarily provided by means of a compression spring which is preferably seated against the movable valve member and associated piston. In carrying out the present invention, applicant provides an auxiliary pressure regulating valve mechanism for producing a uniform regulating fluid cushion pressure, said auxiliary valve mechanism comprising a fluid pressure regulation chamber constructed and arranged to provide a fluid cushion pressure against a differential piston and a novel auxiliary valve mechanism connected thereto adapted for maintaining a uniform fluid cushion pressure in the chamber. It will be understood that applicant's novel auxiliary fluid cushion pressure regulating mechanism, while particularly adapted for use with pressure regulating valves such as those disclosed in the two specific embodiments of the invention illustrated and hereinafter described, is equally well adapted for use with other types of fluid pressure regulating mechanisms in which such pressure regulation is obtained by means of a movable pressure regulating element which is acted upon in one direction by the pressure to be regulated and in the opposite direction by a uniform regulating fluid cushion pressure.

Further in accordance with the present invention, applicant provides a novel construction and arrangement of his fluid pressure regulating valve mechanism in which any tendency of the valve member to chatter, due to the turbulent condition of the actuating fluid set up about the valve seat as the valve member is moved to open or to shut off the connection between actuating pressure and exhaust, is entirely eliminated, thus greatly reducing the wear on the valve seat, and also the noise incidental to operation which has been found most objectionable particularly where heavy actuating pressures are employed. Applicant's improved construction comprises a valve casing having a valve seat and port openings spaced on opposite sides for the admission of the actuating pressure to be regulated, and for exhausting that pressure, and a valve member slideably supported in the casing on bearings which are located on opposite sides of the valve seat and act to provide a rigid unyielding support for the seating portion of the valve member.

Figs. 1 to 3 inclusive of the drawings illustrate one embodiment of the invention in a constant pressure regulating valve which comprises a cylindrical casing 10 within which are supported valve sleeves or bushings 9 and 11 arranged to receive an axially movable valve member 12. A further bearing support for valve member 12 is provided by an inwardly extending flange 13 of the casing 10. As best shown in the somewhat diagrammatic Fig. 2, pressure is supplied to the valve mechanism from a main fluid pressure line 14 and an annular port 16 formed within the valve casing between the bushing 9 and the flange 13. An exhaust connection is provided from the valve casing which comprises an annular exhaust port 18 formed between the bushings 9 and 11 and an exhaust conduit 20. The valve member 12 is provided with a reduced portion 22 having at its right hand end, as shown in Fig. 2, a tapered throttle portion 23 which is operable as the valve member is moved to the right to allow liquid to pass from the inlet port 16 past the throttle opening 23 to the exhaust port 18 and exhaust conduit 20. Actuation of the valve member 12 to open or close the above-described connection to exhaust is controlled by means of a differential piston 24 secured by a screw 25 to the right hand end of the valve member 12 and arranged to slide in a bore 26 formed within the casing 10. A pressure conduit 28 serves to admit fluid pressure from the main conduit 14 to the left hand side of the differential piston 24 and against the piston surfaces 30 to force the piston 24 and valve member 12 to the right. The left hand end of the valve casing 10 is connected to exhaust by means of an exhaust conduit 31.

The pressure regulating valve mechanism above described, has embodied therein a number of novel features which serve to improve the sensitivity of the valve to maintain a constant regulation of actuating pressure in a fluid pressure system, and also to prevent vibration or chatter which has been found to be a serious problem in valves of this general description, particularly when employed for the regulation of very high actuating pressures.

One such feature consists in the specific arrangement of the valve in which bearing supports 13 and 11 are provided for the valve member 12 at opposite ends of the assembly provided by the pressure inlet chamber 16, the exhaust chamber 18, and the intervening seating portion of the valve comprised by the valve sleeve 9. This construction provides a maximum of support for the tapered closing portion 23 of the valve member 12 against lateral vibratory movement which would otherwise tend to be set up due to the turbulent condition of the fluid passing through the valve from the pressure inlet chamber 16 to the exhaust chamber 18.

Another feature of applicant's improved regulating valve consists in the construction and arrangement of the connection from the actuating pressure conduit 14 to the differential piston 24 provided by the duct 28 which is constructed and arranged to cause the actuating pressure to be drawn directly from the conduit 14 at a point which is removed from the pressure chamber 16. With this construction, the condition of variable pressure and turbulence in the pressure chamber 16 which results from the opening and closing of the valve connection to exhaust, cannot interfere with the operation of the differential piston 24 and valve member 12 as determined by variations in the effective actuating pressure in the conduit 14.

In accordance with a principal feature of the present invention, applicant provides a novel and improved means for maintaining a constant pressure regulation of the regulating valve above described, which consists in the provision of an auxiliary pressure regulating valve mechanism which is adapted to maintain a uniform regulated fluid cushion pressure in the right-hand end of the piston cylinder formed by the bore 26 and hereinafter referred to as the pressure regulation chamber 32. Inasmuch as the effective area of the surface 33 of the differential piston 24 against which this back pressure is applied is considerably greater than the effective area of the surfaces 30, a relatively low back pressure may be employed to balance the operation of the valve against the line pressure which it is desired to maintain in the pressure conduit 14. A plug 34, screw-threaded into the right-hand end of the valve casing 10, serves to close this end of the valve cylinder and chamber 32. A light compressison spring 35, seated at one end against the plug 34 and at its other end against the piston 24, serves to move the piston 24 and valve member 12 to the left to insure the proper operation of the valve mechanism when the pressure is initially built up in the fluid pressure system, including the pressure inlet conduit 14.

Applicant's auxiliary fluid cushion pressure regulating valve mechanism comprises an auxiliary valve casing 36 which, as best shown in Figs. 1 and 3 of the drawings, is rigidly secured to the top side of the main valve casing 10 by means of bolts 37. The casing 36 has formed therein a cylindrical bore to which are secured valve sleeves or bushings 38, 39 and 40, adapted to receive an axially movable valve member 41. A duct 42 connects the pressure regulation chamber 32 with the right-hand end of the auxiliary valve cylinder which is closed by means of a plug 43.

The valve member 41 is arranged to be acted upon by means of a compression spring 48 supported within the auxiliary valve casing 36, seated at one end within a recess formed in a plug 50 screw-threaded into the left-hand end of the casing 36, and at its other end against the valve member 41. With this construction and arrangement of the auxiliary valve member 41 and spring 48, it will readily be seen that the spring 48 tends to move the valve member 41 to the right against the fluid cushion pressure existing in the pressure regulation chamber 32 and in the right-hand end of the auxiliary valve 36 connected thereto. In order to maintain a uniform regulating fluid cushion pressure in the pressure regulation chamber 32, the auxiliary valve 41 is constructed and arranged as pressure tends to increase and the valve member 41 is consequently moved to the left, as shown for example in Fig. 2, to open a connection to exhaust, thus reducing the pressure in the chamber 32. Conversely, a reduction in the pressure existing in the chamber 32 will cause the valve 41 to move to the right to close off the exhaust connection and at the same time to open a pressure connection from the main pressure line 14 to build up additional pressure in the chamber 32. The valve connections whereby these operations are effected include a pressure inlet port 52 formed between the bushings 38 and 39 which is connected by means of a duct 54 with the main pressure conduit 14, and an exhaust port 56 formed between the bushings 39 and 40 which is connected by means of ducts 57 with the left-hand end of the auxiliary valve 36, and thence by means of a duct 58 to exhaust. The inlet port 52 and exhaust port 56 may be connected to supply or exhaust pressure from the right-hand end of the auxiliary valve 36 and pressure regulation chamber 32 through a duct 59 which extends axially of the auxiliary valve 41 and opens into a valve chamber formed by the reduced portion 60 of the valve member 41.

On opposite sides of the reduced portion 60 are two lands 62 and 64 having a clearance from the inner peripheral wall of the valve sleeve 39 which may be approximately two-thousandths of an inch, to provide viscous restrictions between the valve chamber 60 and the pressure port 54 and exhaust port 56 respectively. It will be noted that for a hypothetical neutral position of the valve 41, the chamber 60 is connected through viscous restrictions 62 and 64 to both pressure and exhaust. The total distance between the shouldered ends of the lands 62 and 64 in the illustrated construction is approximately five-thousandths of an inch greater than the length of the valve sleeve member 39. These connections are arranged for a central position of the valve member 41 to produce a balanced condition of pressure and exhaust to the chamber 60 and pressure regulation chamber 32 connected thereto. Movement of the valve member 41 to the left will then unbalance these connections in such a manner as to cause fluid to flow to exhaust, the rate of exhaust increasing substantially in proportion to the distance travelled by the valve member 41. Similarly, movement of the valve member 41 to the right from central position will cause fluid under pressure to be admitted to the chamber 60 and regulation chamber 32 at a rate which increases substantially in proportion to the distance travelled by the valve member 41. It will be understood that the dimensions given are for purposes of illustration only, and that applicant's invention is not limited to any particular construction or proportion of these parts.

The valve mechanism above described is intended for use to maintain a constant pressure regulation in a hydraulic system. The operation of applicant's auxiliary valve 36 to maintain a constant predetermined fluid cushion pressure in the pressure regulation chamber 32, and thereby to insure the proper operation of the constant pressure regulating valve 10, may be briefly described as follows: Assuming that an increase of pressure in the main pressure conduit 14 has forced the differential piston 24 and valve member 12 associated therewith to the right, a corresponding increase in fluid cushion pressure will be induced in the pressure regulation chamber 32, causing the auxiliary pressure regulation valve member 41 to be moved to the left against the pressure of its spring 48 to close the pressure port 54 and to open the exhaust port 56 so that liquid is permitted to escape through the conduit 59, chamber 60, viscous restriction 64, port 56 and exhaust conduits 57 and 58, tending immediately to reduce fluid cushion pressure in the pressure regulation chamber 32. During continued movement of the valve member 41 to the left, the effective length of the viscous restriction 64 extending between chamber 60 and exhaust 56 is gradually reduced to permit a corresponding increase in the rate at which fluid is discharged from the chamber 32 to exhaust. The instant the fluid cushion pressure in the pressure regulation chamber 32 drops below the desired level as determined by the adjustment of the spring 48, the valve member 41 will be moved again to the right by the spring 48 causing the effective length of the viscous restriction 64 to be increased, and the rate of exhaust from the chamber 32 to be correspondingly reduced. Continued movement of the valve member 41 to the right through its central position, now acts to open the pressure inlet port 59, causing liquid under pressure to be forced through viscous restriction 62 to the chamber 60, and thence through conduits 59 and 42 into the pressure regulation chamber 32 to produce a condition of substantial balance between pressure and exhaust in the valve. The continued movement of the valve member 41 to the right then causes the connection to exhaust through port 56 to be entirely shut off, while at the same time the rate at which fluid pressure is admitted, is gradually increased as the effective length of the viscous restriction 62 extending between the chamber 60 and inlet port 52 is reduced. When the increase of fluid cushion pressure in the chamber 32 passes the predetermined amount, determined as above stated by the strength of the spring 48, the valve member 41 will be again moved to the left against the pressure of the spring 48 to reverse the process.

The substantially uniform fluid cushion pressure maintained in the pressure regulation chamber 32 by the auxiliary valve mechanism above described operates most effectively to damp movement of the main valve member and piston 24, and thus to prevent excessive fluctuations of pressure in the main line conduit 14.

The operation of the auxiliary valve member 41 to compensate for variations in fluid cushion pressure in the pressure regulation chamber 32 caused by the displacement of the piston 24 may be briefly described as follows: Assuming that the pressure in the pressure regulation chamber 32 has increased above the desired level and the auxiliary valve member 41 is therefore being moved to the left, as the valve member now reaches the hypothetical neutral position shown in Fig. 2, the amount of the fluid cushion pressure in the chamber 32 is reduced through the opening of the exhaust port 56. At the same time, however, fluid pressure continues to be admitted through the inlet port 54, so that only a relatively small net reduction in pressure results, which is, however, sufficient to partially check the movement of the valve member 41 against the pressure of the spring 48. Continued movement of the valve member 41 may then completely close off the inlet port 54, while at the same time the length of the viscous restriction 64 is considerably reduced, permitting a very rapid reduction of fluid cushion pressure in the chamber 32. This reduction in pressure is, however, instantly checked by the reversal in direction of movement of the auxiliary valve member 41 as the spring 48 becomes effective to move the valve member 41 in the opposite direction. Similarly, the increase of fluid cushion pressure effected as the valve member 41 moves to the right is damped by the continued exhaust of pressure through the viscous restriction 64 and exhaust port 56 as the pressure inlet 54 is opened and the length of the viscous restriction 62 is reduced during movement of the valve member 41 through the hypothetical neutral position shown in Fig. 2.

Applicant's auxiliary pressure regulating valve mechanism above described has the advantage that it is extremely sensitive in operation and permits the maintenance of a uniform fluid cushion pressure which is of great value in obtaining an accurate and consistent pressure regulation in a pressure regulating device of the type described. As compared with pressure regulating devices in which the desired back pressure is obtained by the use of a compression spring acting directly upon the movable valve member and associated piston, fluctuations in operation of the device such as those produced by variations in the loading of the compression spring and consequent variations in the cushion pressure produced thereby have been substantially eliminated. Applicant's device is of particular advantage where it is required to secure an accurate regulation of heavy pressures in a fluid pressure system which may run as high as 2,000 pounds or more per square inch, since a relatively light and sensitive compression spring 48 may be employed in the auxiliary valve which functions as a pilot valve to admit or to exhaust fluid cushion pressure and so to maintain the fluid cushion pressure in the pressure regulation chamber 32 at the desired level.

A second embodiment of applicant's invention, as applied to a differential pressure valve regulating mechanism, is illustrated in Fig. 4 of the drawings. In this embodiment of the invention, applicant's auxiliary fluid cushion pressure regulating mechanism is employed in combination with a differential pressure control valve to secure an accurate and dependable regulation of differential pressure between two points in a pressure fluid conduit. As somewhat diagrammatically shown in Fig. 4 of the drawings, a differential pressure control valve is provided, generally designated at 80, which is constructed and arranged to maintain a constant differential in pressure between an incoming pressure conduit 82 and an outgoing pressure conduit 84, these conduits being connected by means of a throttle valve generally designated at 86. The differential valve mechanism illustrated comprises essentially a pressure regulating valve for controlling the pressure in the incoming pressure conduit 82 and means responsive to variations in resistance and consequent variations in pressure in the outgoing pressure conduit 84 for controlling the operation of the regulating valve to maintain a predetermined pressure differential between respective incoming pressure conduit 82 and outgoing pressure conduit 84. The differential pressure valve 80 comprises a cylindrical valve casing having secured to the inner periphery thereof valve sleeves or bushings 90 and 91 arranged to receive a longitudinally movable valve member 88. The valve member 88 is provided at one end with a differential piston 92 fitted to slide within a bore 94 in the casing 80, and is provided at the opposite end thereof with a piston 96 fitted to slide within an enlarged bore 98 formed in the valve sleeve member 91. An annular pressure inlet port 100 formed between the valve sleeve 90 and a flange 105 in the casing of valve 80 is connected by means of a conduit 102 with the incoming pressure conduit 82. Fluid pressure is exhausted from the valve through an annular exhaust port 104 provided between the valve sleeves 90 and 91 which connects directly with an exhaust conduit 106. A reduced portion 108 formed in the valve member 88 having at its right-hand end, as shown in Fig. 4, a shouldered portion 110, is arranged as the valve member 88 is moved to the right to provide a throttle opening between the pressure inlet 100 and the exhaust port 104, thus connecting the incoming pressure conduit 82 with exhaust.

Movement of the valve member 88 is controlled to maintain the desired higher differential pressure in the incoming pressure conduit 82 by means of pressure connections from the incoming conduit 82 and outgoing conduit 84 which are arranged to direct fluid under pressure in opposite directions against substantially equal surface areas of the pistons 92 and 96, the differential pressure being maintained as hereinafter more fully described by means of applicant's fluid cushion auxiliary pressure regulating device which acts to provide a constant regulated fluid cushion pressure upon that side of the differential piston 92 having the larger effective surface area. The amount of the regulating fluid cushion pressure employed is adjustably determined in accordance with the differential which it is desired to maintain between the pressures in the incoming conduit 82 and outgoing conduit 84. As shown in Fig. 4 of the drawings, fluid pressure from the incoming conduit 82 is directed from the inlet port 100 through a passageway formed between the valve member 88 and the adjacent inner wall of the flange 105 into a chamber 114, the pressure thus supplied acting against surfaces 116 of the piston 92 to force the valve member 88 to the right. Fluid pressure is admitted from the outgoing conduit 84 through a duct 118 to a piston chamber 120, the outgoing pressure thus supplied acting against surfaces 122 of piston 96 to force the valve member 88 to the left. The effective areas of the piston surfaces 116 and 122 are substantially equal. In the preferred construction of the differential valve mechanism illustrated in Fig. 4, there is also provided at the right-hand end of the valve 80 a fluid cushion pressure regulation chamber 124 for directing fluid pressure against surface 125 forming the right-hand end of the differential piston 92.

Further in accordance with the present invention, the differential pressure regulating valve 80 is constructed and arranged to be assembled with applicant's improved auxiliary fluid cushion pressure regulating mechanism above described which will operate to maintain the desired level of fluid cushion pressure in the chamber 124. Inasmuch as this auxiliary mechanism comprising the valve casing 36, movable valve member 41, compression spring 48 and associated parts, is identical with similar parts described and illustrated in connection with Figs. 1, 2 and 3, and operates in identical manner, identical numbers have been employed to designate these identical parts. The casing 36, in the present instance, is directly secured to the differential valve casing 80, the chamber 124 being connected by a conduit 126 with the right-hand end of the auxiliary cushion pressure regulating valve 36, the pressure inlet 54 being connected by a conduit 128 with the inlet port 100 through which pressure is admitted from the incoming pressure conduit 82, and the exhaust port 56 being connected by means of a conduit 130 with the exhaust port 104 and exhaust conduit 106. A small compression spring 132 seated against a plug 134 closing the right-hand end of the differential valve casing 80 and against the piston 92, tends to maintain the valve member 88 in a starting position at the extreme left to insure the proper operation of the differential valve mechanism when pressure is first built up in the incoming pressure conduit 82.

The operation of the differential valve mechanism above described may be briefly described as follows: Assuming that the desired pressure differential exists between the incoming conduit 82 and outgoing conduit 84, the pressure in the incoming conduit 82 acting against surfaces 116 of differential piston 92 will be exactly balanced by the pressure in the outgoing conduit 84 acting against the piston surfaces 122 to which is added the predetermined fluid cushion pressure maintained in the pressure regulation chamber 124 which acts against the surface 125 of the differential piston 92. The pressure supplied to the incoming conduit 82 is maintained at the desired level through the operation of the valve 88 which, as this pressure tends to increase, moves to the right opening the connection through the throttle opening 110 from pressure to exhaust. If the resistance and consequent pressure level in the outgoing conduit 84 is now for example increased, the piston 88 will tend to move to the left, closing the throttle opening 110 to exhaust and allowing additional pressure to be built up in the incoming pressure conduit 82 and piston chamber 114 until the condition of equilibrium is restored. While these changes are taking place, a constant differential pressure regulation is maintained by applicant's auxiliary fluid cushion pressure regulating valve mechanism which operates, as above described, to maintain a predetermined uniform fluid cushion pressure in the pressure regulation chamber 124 during movement of the valve member 88 and piston 92 in either direction.

It will be understood that the invention is not limited to the specific embodiment shown, and that various deviations may be made therefrom without departing from the spirit and scope of the appended claims.

What is claimed is:

1. In a fluid pressure regulating device, the combination of a movable pressure control element arranged to be acted upon by the pressure to be regulated against a uniform regulating fluid cushion pressure, an auxiliary pressure regulating mechanism for maintaining said fluid cushion pressure at a constant value including a movable valve arranged to be acted upon in one direction by said fluid cushion pressure, opposing spring means acting to urge said valve member in an opposite direction, an exhaust connection rendered operative by movement of the valve member against the pressure of said spring means induced by increase of said fluid cushion pressure to exhaust said fluid cushion pressure, and a pressure supply connection rendered operative by movement of the valve member in the opposite direction induced by reduction of the fluid cushion pressure to increase said fluid cushion pressure, whereby said fluid cushion pressure is maintained at a substantially constant value irrespective of any displacement of said pressure control element induced by fluctuation of the pressure to be regulated.

2. In a fluid pressure regulating device, the combination of a movable pressure control element arranged to be acted upon by the pressure to be regulated against a uniform fluid cushion pressure, an auxiliary pressure regulating valve mechanism for producing a uniform regulating fluid cushion pressure including a fluid cushion pressure regulation chamber for directing fluid cushion pressure against said pressure control element, and a movable valve member arranged to be acted upon in one direction by the fluid cushion pressure in said cushion pressure chamber, and opposing spring means acting to urge said valve member in an opposite direction, an exhaust connection rendered operative by movement of the valve member against the pressure of said spring means induced by increase of said fluid cushion pressure to exhaust said fluid cushion pressure, and a pressure supply connection rendered operative by movement of the valve member in the opposite direction induced by reduction of the fluid cushion pressure to increase said cushion pressure, whereby said fluid cushion pressure is maintained at a substantially constant value irrespective of any displacement of said pressure control element induced by fluctuation of the pressure to be regulated.

3. In a fluid pressure regulating device, the combination of a displaceable pressure control element arranged to be acted upon by the pressure to be regulated against a uniform regulating fluid cushion pressure, an auxiliary pressure regulating means for producing said regulating fluid cushion pressure including a fluid cushion pressure regulation chamber for directing fluid cushion pressure against said pressure control element, and an auxiliary pressure regulating valve and means associated with said fluid cushion pressure chamber including a valve casing and connections therefrom to pressure, and exhaust, and to said fluid cushion pressure chamber, and a valve member movable in one direction by increase of fluid cushion pressure to connect said cushion pressure chamber with exhaust, and movable in the opposite direction by reduction of fluid cushion pressure to connect said cushion pressure chamber to pressure, said valve member being connected to be acted upon by the fluid cushion pressure in said cushion pressure chamber to shift the valve member to exhaust position, and opposing spring means tending to move said valve member in an opposite direction to connect said cushion pressure chamber to pressure, whereby said fluid cushion pressure is maintained at a substantially constant value irrespective of any displacement of said pressure control element induced by fluctuation of the pressure to be regulated.

4. In a fluid pressure regulating device, the combination of a movable pressure control element arranged to be acted upon by the pressure to be regulated against a uniform regulating fluid cushion pressure, an auxiliary pressure regulating means for producing said regulating fluid cushion pressure including a fluid cushion pressure regulation chamber for directing fluid cushion pressure against said pressure control element, and an auxiliary pressure regulating valve and means associated with said fluid cushion pressure chamber including a valve casing and connections therefrom to pressure, and exhaust, and to said cushion pressure chamber, and a valve member movable in one direction by increase of fluid cushion pressure to connect said cushion pressure chamber with exhaust, and movable in the opposite direction by reduction of fluid cushion pressure to connect said cushion pressure chamber to pressure, and for a limited central portion of said movement to connect said cushion pressure chamber to both pressure and exhaust, said valve member being connected to be acted upon by the fluid cushion pressure in said cushion pressure chamber to shift the valve member to exhaust position, and opposing spring means tending to move said valve member in an opposite direction to connect said cushion pressure chamber to pressure, whereby said fluid cushion pressure is maintained at a substantially constant value irrespective of any displacement of said pressure control element induced by fluctuation of the pressure to be regulated.

5. In a fluid pressure regulating device, a regulating fluid cushion pressure chamber, and cushion pressure regulating valve means for maintaining a uniform fluid cushion pressure in said cushion chamber comprising a movable valve member arranged to be acted upon in one direction by the fluid pressure in said cushion pressure chamber, and opposing spring means acting to urge the valve member in the opposite direction, a fluid cushion pressure admission chamber movable with the valve member, and a fluid connection therefrom to the fluid cushion pressure chamber, a fluid pressure supply connection and a fluid pressure exhaust connection disposed at opposite sides of said admission chamber, and viscous restrictions adapted for a central portion of said movement of the valve chamber to connect the admission chamber with both said supply and exhaust connections.

6. In a fluid pressure regulating device, the combination of a movable pressure control element arranged to be acted upon by the pressure to be regulated against a uniform regulating fluid cushion pressure, an auxiliary cushion pressure regulating valve mechanism for producing a uniform regulating fluid cushion pressure including a fluid cushion pressure regulation chamber for directing fluid cushion pressure against said pressure control element, and a movable valve member arranged to be acted upon in one direction by the fluid pressure in said fluid pressure chamber, and opposing spring means acting to urge said valve member in an opposite direction, an exhaust connection including a viscous restriction which is reduced in length by movement of the valve member induced by increase of said fluid cushion pressure from an intermediate position against the pressure of said spring means, and a pressure supply connection including a viscous restriction which is reduced in length by movement of the valve member induced by decrease of said cushion pressure from an intermediate position in the opposite direction, whereby said fluid cushion pressure is maintained at a substantially constant value irrespective of any displacement of said pressure control element induced by fluctuation of the pressure to be regulated.

7. In a fluid pressure regulating device, the combination of a movable pressure control element arranged to be acted upon by the pressure to be regulated against a uniform regulating cushion pressure, an auxiliary pressure regulating valve mechanism for producing a uniform regulating cushion pressure including a fluid cushion pressure regulation chamber for directing fluid cushion pressure against said pressure control element, and a movable valve member arranged to be acted upon in one direction by the fluid pressure in said cushion pressure chamber, and opposing spring means acting to urge said valve member in an opposite direction, a connection to said cushion pressure chamber, pressure and exhaust connections each including a viscous restriction through which said cushion pressure chamber connection is connected to both pressure and exhaust for an intermediate position of the valve member, said connections being constructed and arranged so that movement of the valve member induced by increase of cushion pressure against the pressure of said spring means will increase the effective length of the pressure restriction and reduce the effective length of the exhaust restriction, and movement of the valve member in the opposite direction induced by decrease of cushion pressure will increase the effective length of the exhaust restriction and reduce the effective length of the pressure restriction, whereby said cushion pressure is maintained at a substantially constant value irrespective of any displacement of said pressure control element induced by fluctuation of the pressure to be regulated.

8. In a fluid pressure regulating device, the combination of a movable pressure control element arranged to be acted upon by the pressure to be regulated against a uniform regulating fluid cushion pressure, an auxiliary pressure regulating means for producing said cushion pressure including a fluid cushion regulation chamber for directing fluid cushion pressure against said pressure control element, and auxiliary pressure regulating valve means associated with said cushion pressure chamber including a valve casing and a removable valve member, a connection for directing said cushion pressure to move the valve member in one direction, and opposing spring means acting to urge the valve member in the opposite direction, a fluid cushion pressure admission chamber in said valve member, and a connection therefrom to said cushion pressure chamber, pressure exhaust ports in the casing spaced for an intermediate position of the valve member on opposite sides of the cushion fluid admission chamber, and fluid restrictions connecting said fluid cushion admission chamber with said pressure and exhaust ports, said connections being constructed and arranged so that movement of the valve member induced by increase of said cushion pressure against the pressure of said spring means will permit fluid to be exhausted from the cushion pressure chamber at an increasing rate, and movement of the valve member in the opposite direction induced by decrease of cushion pressure will permit fluid under pressure to be admitted to the cushion chamber at an increasing rate, whereby said cushion pressure is maintained at a substantially constant valve irrespective of any displacement of said pressure control element induced by fluctuation of the pressure to be regulated.

9. In a fluid pressure regulating device, the combination of a movable pressure control element arranged to be acted upon by the pressure to be regulated against a uniform regulating fluid cushion pressure, auxiliary cushion pressure regulating means for producing said fluid cushion pressure including a fluid cushion pressure regulation chamber for directing fluid cushion pressure against said pressure control element, and auxiliary cushion pressure regulating valve means associated with said cushion pressure chamber including a cylindrical valve casing having a connection between the cushion pressure chamber and one end of the cylinder, and pressure and exhaust ports spaced in that order in said end of the cylinder, a valve member having a reduced portion of sufficient length to connect with both of said pressure and exhaust ports for a central position only of said valve member, and an axially extending duct connecting said reduced portion with the cushion pressure chamber, and spring means acting to urge said valve member against the fluid cushion pressure in said cushion pressure chamber to close said exhaust port, whereby said cushion pressure is maintained at a substantially constant value irrespective of any displacement of said pressure control element in- 10. In a fluid pressure regulating device, the combination of a movable pressure control element arranged to be acted upon by the pressure to be regulated against a uniform regulating fluid cushion pressure, auxiliary cushion pressure regulating means for producing said cushion pressure including a fluid cushion pressure regulation chamber for directing fluid cushion pressure against said pressure control element, and auxiliary cushion pressure valve means associated with said cushion pressure chamber including a valve casing having a connection between the cushion pressure chamber and one end of the cylinder, and pressure and exhaust ports spaced in that order from said end of the cylinder, a valve member having a reduced spool portion forming a fluid cushion pressure admission chamber, and a fluid connection therefrom to the cushion pressure chamber, and on opposite sides thereof lands to form viscous restrictions connecting with each of said pressure and exhaust ports, and spring means acting to urge said valve member against the cushion pressure in said cushion pressure chamber, whereby said cushion pressure is maintained at a substantially constant value irrespective of any displacement of said pressure control element induced by fluctuation of the pressure to be regulated.

11. In a fluid pressure regulating device, a cushion fluid pressure chamber and cushion pressure regulating valve means for maintaining a uniform fluid cushion pressure in said cushion pressure chamber which comprises a valve casing having a connection between the cushion pressure chamber and one end of the valve casing, pressure and exhaust ports spaced in that order from said end of the cylinder, a valve member having a reduced portion forming a fluid cushion pressure admission chamber and a fluid connection therefrom to the cushion pressure chamber, and on opposite sides thereof lands to form viscous restrictions adapted for an intermediate position of said valve member to connect the fluid cushion pressure admission chamber with both pressure and exhaust, and spring means acting to urge the valve member against the oppositely resisting cushion fluid pressure from said cushion fluid chamber.

12. In a fluid pressure regulating device, the combination of a main pressure regulating valve comprising a cylindrical valve casing and connections therefor to pressure and exhaust, a valve element supported therein movable to connect or shut off the connection between pressure and exhaust, a differential piston associated with said valve element, and a pressure connection directed to the side of said piston having the smaller effective area tending to move the valve element to open said connection between pressure and exhaust, pressure regulating means acting upon said piston to shut off said exhaust connection comprising a fluid cushion pressure regulation chamber arranged to direct fluid cushion pressure against the side of said piston having the larger effective area, and auxiliary cushion pressure regulating valve means associated with said cushion pressure chamber including a movable auxiliary valve element arranged to be acted upon in one direction by the fluid pressure in said cushion pressure chamber, and opposing spring means acting to urge said valve member in an opposite direction, an exhaust connection rendered operative by movement of the valve member induced by increase of said cushion pressure against the pressure of said spring means to exhaust said cushion pressure, and a pressure supply connection rendered operative by movement of the valve member in the opposite direction induced by decrease of said cushion pressure to increase said back pressure, whereby said fluid cushion pressure is maintained at a substantially constant value irrespective of any displacement of said main valve element induced by fluctuation of the pressure to be regulated.

13. In a fluid pressure regulating device, the combination of a main pressure regulating valve comprising a movable valve element, connections to pressure and exhaust associated therewith, a piston connected to said valve element, and a pressure connection directed to one side of said piston tending to move the valve element to exhaust position, pressure regulating means acting upon said piston to close said main pressure regulating valve comprising a fluid cushion pressure regulation chamber, and auxiliary fluid cushion pressure regulating valve means associated with said cushion pressure chamber including connections from said cushion pressure chamber to pressure and to exhaust, and an auxiliary cushion pressure regulating valve having a valve member movable in one direction to connect said cushion pressure chamber with exhaust and movable in the opposite direction to connect said cushion pressure chamber to pressure and for a limited central portion of said movement to connect said cushion pressure chamber to both pressure and exhaust, said valve member being connected to be acted upon by the pressure in said cushion pressure chamber to shift the valve member to exhaust position, and opposing spring means tending to move said valve member in an opposite direction to connect said pressure chamber to pressure, whereby said fluid cushion pressure is maintained at a substantially constant value irrespective of any displacement of said movable valve element induced by fluctuation of the pressure to be regulated.

14. In a fluid pressure regulating device, the combination of a main pressure regulating valve comprising a movable valve element, connections to pressure and exhaust associated therewith, a differential piston associated with said valve element, and a pressure connection directed to that side of said piston having the smaller effective area tending to move the valve element to exhaust position, pressure regulating means acting upon said piston to close said relief valve comprising a fluid cushion pressure regulation chamber connected with the side of said piston having the larger effective area, and auxiliary cushion pressure regulating valve means associated with said cushion pressure chamber including a valve casing and connections therefrom to pressure, to exhaust, and to said cushion pressure chamber, and a valve member movable in one direction to connect said cushion pressure chamber with exhaust and movable in the opposite direction to connect said cushion pressure chamber to pressure, and for a limited central portion of said movement to connect said cushion pressure chamber to both pressure and exhaust, said valve member being connected to be acted upon by the cushion pressure in said cushion pressure chamber to shift the valve member to exhaust position, and opposing spring means tending to move said valve member in an opposite direction to connect said cushion pressure chamber to pressure, whereby said fluid cushion pressure is maintained at a substantially constant value irrespective of any displacement of the movable valve element induced by fluctuation of the pressure to be regulated.

15. In a fluid pressure regulating device for maintaining a constant pressure difference between two points in a fluid pressure conduit, the combination of a differential pressure regulating device including a differential pressure control element arranged to be acted upon by the pressure in the incoming conduit against the pressure in the outgoing conduit supplemented by uniform regulating cushion pressure, an auxiliary cushion pressure regulating valve mechanism for producing a uniform regulating cushion pressure including a fluid cushion pressure regulation chamber for directing said fluid cushion pressure against the pressure control element and a movable valve member arranged to be acted upon in one direction by the fluid cushion pressure in said cushion pressure chamber, and opposing spring means acting to urge said valve member in an opposite direction, and connections from said cushion pressure chamber to pressure and to exhaust constructed and arranged to be rendered operative by movement of said valve member induced by increase of said cushion pressure against the pressure of said spring means to exhaust said cushion pressure and by movement of the valve member in the opposite direction induced by decrease of said cushion pressure to increase said cushion pressure, whereby said fluid cushion pressure is maintained at a substantially constant value irrespective of any displacement of said differential pressure relief valve element induced by fluctuation of differential pressure.

16. In a fluid pressure regulating device for maintaining a constant pressure difference between two points in a pressure fluid conduit, the combination of a differential pressure relief valve comprising connections to said incoming conduit and to exhaust, a valve element movable to connect said incoming conduit directly to exhaust, and actuating means for said valve element including a connection from said incoming pressure conduit through which pressure is directed to move said valve element in a direction to open said exhaust connection, and a connection from said outgoing conduit through which pressure is directed to move the valve element in the opposite direction, fluid cushion pressure regulating means acting on said valve element to move the valve element in said opposite direction to close the exhaust comprising a fluid cushion pressure regulation chamber from which fluid cushion pressure is directed to move the valve element in said opposite direction, and auxiliary cushion pressure regulating valve means associated with said cushion pressure chamber including connections from said cushion pressure chamber to pressure and exhaust, and an auxiliary cushion pressure regulating valve comprising a movable auxiliary valve element and connections controlled by movement of said auxiliary valve element in opposite directions to connect said cushion pressure chamber alternatively to pressure and exhaust, said auxiliary valve element being arranged to be acted upon by the cushion pressure in said cushion pressure chamber to shift said valve member to exhaust position, and opposing spring means tending to move said auxiliary valve element in the opposite direction to connect said cushion pressure chamber to pressure, whereby said fluid cushion pressure is maintained at a substantially constant value irrespective of any displacement of said differential pressure relief valve element induced by fluctuations of differential pressure.

17. In a fluid pressure regulating device, a pressure regulating valve which comprises a cylindrical valve casing, an axially movable valve member supported in the casing, a piston associated therewith arranged to be acted upon by the pressure to be regulated in a direction to open the valve, and means for exerting a uniform predetermined fluid cushion pressure upon said piston to move the valve member in the opposite direction, said casing having formed therein a valve seat, pressure and exhaust chambers located on opposite sides of said seat axially of the casing, connections therefrom to pressure and to exhaust respectively, and bearing supports for said valve member located on opposite sides of said seat and beyond said pressure and exhaust chambers respectively.

18. In a fluid pressure regulating device, a pressure regulating valve which comprises a cylindrical valve casing having a sleeve valve seat, an axially movable valve member supported in the casing having a shouldered closure portion arranged to slide within the sleeve valve seat, and a reduced spool portion adjacent thereto connected to exhaust, said casing having formed therein pressure and exhaust ports located on opposite sides of said sleeve valve seat axially of the valve, bearing supports for said valve member located on opposite sides of said seat and beyond said pressure and exhaust ports respectively, a valve piston formed to move with the valve member and arranged to be acted upon by the pressure to be regulated in a direction to open the valve to exhaust, and means for exerting a uniform cushion pressure to urge the valve member in the opposite direction.

19. In a fluid pressure regulating device, a pressure regulating valve which comprises a cylindrical valve casing having a sleeve valve seat, an axially movable valve member supported in the casing having a shouldered closure portion arranged to slide within the sleeve valve seat, and a reduced spool portion adjacent thereto connected to exhaust, said casing having formed therein pressure and exhaust ports located on opposite sides of said sleeve valve seat axially of the valve, bearing supports for said valve member located on opposite sides of said seat and beyond said pressure and exhaust ports respectively, a valve piston formed to move with the valve member, and a port separated from said first-mentioned pressure port for the admission of the fluid pressure to be regulated against said piston to move said piston and valve member in a direction to open the valve to exhaust, and means for exerting a uniform cushion pressure to urge the valve member in the opposite direction.

GEORGE F. MAGLOTT.